US008340400B2

(12) United States Patent
Lukas et al.

(10) Patent No.: US 8,340,400 B2
(45) Date of Patent: Dec. 25, 2012

(54) SYSTEMS AND METHODS FOR EXTRACTING PLANAR FEATURES, MATCHING THE PLANAR FEATURES, AND ESTIMATING MOTION FROM THE PLANAR FEATURES

(75) Inventors: Jan Lukas, Melnik (CZ); Ondrej Kotaba, Orlova (CZ)

(73) Assignee: Honeywell International Inc., Morristown, NJ (US)

( * ) Notice: Subject to any disclaimer, the term of this patent is extended or adjusted under 35 U.S.C. 154(b) by 655 days.

(21) Appl. No.: 12/436,224

(22) Filed: May 6, 2009

(65) Prior Publication Data

US 2010/0284572 A1   Nov. 11, 2010

(51) Int. Cl.
  *G06K 9/00* (2006.01)
(52) U.S. Cl. ........................................................ 382/154
(58) Field of Classification Search ........................ None
  See application file for complete search history.

(56) References Cited

U.S. PATENT DOCUMENTS

| | | | |
|---|---|---|---|
| 4,891,630 A | 1/1990 | Friedman et al. | |
| 5,383,013 A | 1/1995 | Cox | |
| 5,870,490 A | 2/1999 | Takahashi et al. | |
| 5,978,504 A | 11/1999 | Leger | |
| 5,988,862 A | 11/1999 | Kacyra et al. | |
| 6,307,959 B1 * | 10/2001 | Mandelbaum et al. | 382/154 |
| 6,704,621 B1 * | 3/2004 | Stein et al. | 701/1 |
| 6,724,383 B1 | 4/2004 | Herken et al. | |
| 6,771,840 B1 | 8/2004 | Ioannou et al. | |
| 6,911,995 B2 | 6/2005 | Ivanov et al. | |
| 7,065,461 B2 | 6/2006 | Chang et al. | |
| 7,203,342 B2 | 4/2007 | Pedersen | |
| 7,215,810 B2 | 5/2007 | Kaufmann et al. | |
| 7,239,751 B1 | 7/2007 | Amador | |
| 7,605,817 B2 | 10/2009 | Zhang et al. | |
| 7,639,896 B2 | 12/2009 | Sun et al. | |
| 7,643,966 B2 | 1/2010 | Adachi et al. | |
| 7,956,862 B2 | 6/2011 | Zhang et al. | |
| 2003/0067461 A1 | 4/2003 | Fletcher et al. | |

(Continued)

FOREIGN PATENT DOCUMENTS

EP   1780678   5/2007

(Continued)

OTHER PUBLICATIONS

Kotaba, U.S. Appl. No. 12/234,331, filed Sep. 19, 2008 "System and Method of Extracting Plane Features".

(Continued)

*Primary Examiner* — Claire X Wang
*Assistant Examiner* — Jhere Rowland
(74) *Attorney, Agent, or Firm* — Fogg & Powers LLC (57) ABSTRACT

A method of controlling an actuator based on a set of three-dimensional (3D) data points is provided. The method includes obtaining a first set of 3D data points for a scene and a second set of 3D data points for a scene with a sensor. At least a first set of planar features is extracted from the first set of 3D data point. At least a second set of planar features is extracted from the second set of 3D data points. A motion is determined between the first set of 3D data points and the second set of 3D data points based on a rotation and a translation from the at least a first set to the at least a second set. At least one actuator is controlled based on the motion.

20 Claims, 7 Drawing Sheets

U.S. PATENT DOCUMENTS

| | | | |
|---|---|---|---|
| 2004/0183905 A1* | 9/2004 | Comaniciu et al. | 348/148 |
| 2004/0234136 A1* | 11/2004 | Zhu et al. | 382/224 |
| 2005/0069173 A1 | 3/2005 | Morisada et al. | |
| 2005/0114059 A1 | 5/2005 | Chang et al. | |
| 2006/0221072 A1* | 10/2006 | Se et al. | 345/420 |
| 2006/0256114 A1* | 11/2006 | Nielsen et al. | 345/440 |
| 2007/0217682 A1 | 9/2007 | Motomura et al. | |
| 2007/0234230 A1 | 10/2007 | Pedersen | |
| 2007/0285217 A1* | 12/2007 | Ishikawa et al. | 340/435 |
| 2008/0013836 A1 | 1/2008 | Nakamura et al. | |
| 2008/0096152 A1 | 4/2008 | Cheang | |
| 2010/0053191 A1 | 3/2010 | Chang et al. | |
| 2010/0074473 A1 | 3/2010 | Kotaba | |
| 2010/0104199 A1 | 4/2010 | Zhang et al. | |
| 2010/0111370 A1 | 5/2010 | Black et al. | |
| 2011/0274343 A1 | 11/2011 | Krishnaswamy et al. | |

FOREIGN PATENT DOCUMENTS

| | | |
|---|---|---|
| EP | 2026279 | 2/2009 |
| EP | 2166375 | 3/2010 |
| EP | 2249311 | 11/2010 |
| GB | 2405776 | 3/2005 |
| JP | 11325833 | 11/1999 |
| WO | 0108098 | 2/2001 |
| WO | 2007056768 | 5/2007 |

OTHER PUBLICATIONS

Barnat, J. et al., "Distributed LTL Model-Checking in SPIN", "International Workshop on SPIN Model Checking", 2001, pp. 1-17, Publisher: Springer-Verlag New York, Inc.

Bosnacki, D. et al., "Symmetric Spin", "Lecture Notes in Computer Science", 2000, pp. 1-19, No. 1885, Publisher: Springer-Verlag.

Bosnacki et al., "A Heuristic for Symmetry Reductions with Scalarsets", "Proc. Int. Symp. Formal Methods for Increasing Sofware Productivity", 2001, pp. 1-15, Publisher: Lecture Notes in Computer Science.

Brim, L. et al., "Distributed LTL Model Checking Based on Negative Cycle Detection", "Lecture Notes in Computer Science", 2001, pp. 96-107, vol. 2245, Publisher: Springer-Verlag.

Hendriks, M. et al., "Adding Symmetry Reduction to UPPAAL", "Lecture Notes in Computer Science", 2004, pp. 1-21, vol. 2791, Publisher: Springer Berlin.

Iosif, Radu, "Symmetry Reduction Criteria for Software Model Checking", "Lecture Notes in Computer Science", 2002, pp. 1-20, vol. 2318, Publisher: Springer-Verlag.

Lerda, Flavio and Riccardo Sisto, "Distributed-Memory Model Checking with SPIN", "Lecture Notes in Computer Science", 1999, pp. 22-39, vol. 1680, Publisher: Springer-Verlag.

Lin, Chung-Chen and Rey-Jer You, "Planar Feature Extration from LIDAR Data Based on Tensot Analysis", available at: http://www.aars-acrs.org/acrs/proceeding/ACRS2006/Papers/M-1_M5.pdf, 2006, pp. 1-7, Publisher: Asian Association on Remote Sensing.

Manku, G. et al., "Structural Symmetry and Model Checking", "Lecture Notes in Computer Science", 1998, vol. 1427, pp. 1-13, Publisher: Springer-Verlag.

Norris, C. and David L. Dill, "Better Verification Through Symmetry", "IFIP Transactions", 1993, pp. 1-34, vol. A-32, Publisher: North-Holland Publishing Co.

Rangarajan, M. et al., "Analysis of Distributed Spin Applied to Industrial-Scale Models", "Lecture Notes in Computer Science", Apr. 2004, vol. 2989, pp. 1-19, Publisher: Springer Verlag.

Stern, Urlich and David L. Dill, "Parallelizing the Mur Verifier", "Formal Methods in System Design", 2001, pp. 1-14, vol. 18, No. 2, Publisher: Kluwer Academic Publishers.

European Patent Office, "European Search Report", Jul. 28, 2010, Published in: EP.

Steinhauser et al., "Motion Segmentation and Scene Classification from 3D LIDAR Data", "2008 IEEE Intellegent Vehicles Symposium", Jun. 4-6, 2008, pp. 398-403, Publisher: IEEE, Published in: Eindhoven, The Netherlands.

U.S. Patent and Trademark Office, "Office Action", "U.S. Appl. No. 12/234,331", Aug. 28, 2012, pp. 1-19.

Pfister, "Algorithms for Mobile Robot Localization and Mapping, Incorporating Detailed Noise Modeling and Multi-Scale Feature", Apr. 14, 2006, pp. 1-200.

Sagues et al, "Robust line matching in image pairs of scenes with dominant planes", "Optical Engineering", 2006, pp. 1-12, vol. 45, No. 6.

Lin et al., "Robust Invariant Features for Object Recognition and Mobile Robot Navigation", "IAPR Conference on Machine Vision Applications", May 2005, pp. 1-4.

De La Puente et al., "3D Feature Based Mapping Towards Mobile Robots' Enhanced Performance in Rescue Mission", Oct. 10, 2009, pp. 1-6, Publisher: IEEE.

European Patent Office, "Office Action", "from Foreign Counterpart of U.S. Appl. No. 12/775,865", Aug. 17, 2011, pp. 1-7, Published in: EP.

European Patent Office, "European Search Report", "from Foreign Counterpart of U.S. Appl. No. 12/775,865", Aug. 2, 2011, pp. 1-4, Published in: EP.

U.S. Patent and Trademark Office, "Final Office Action", "U.S. Appl. No. 12/775,865", Feb. 1, 2012, pp. 1-24.

U.S. Patent and Trademark Office, "Notice of Allowance", "U.S. Appl. No. 12/775,865", Apr. 27, 2012, pp. 1-16.

U.S. Patent and Trademark Office, "Office Action", "U.S. Appl. No. 12/775,865", Sep. 6, 2011, pp. 1-23.

European Patent Office, "European Search Report", "from Foreign Counterpart of U.S. Appl. No. 12/234,331", Sep. 5, 2011, Published in: EP.

European Patent Office, "Office Action", "from Foreign Counterpart of U.S. Appl. No. 12/234,331", Oct. 6, 2011, pp. 1-5, Published in: EP.

U.S. Patent and Trademark Office, "Advisory Action", "U.S. Appl. No. 12/234,331", Jun. 25, 2012, pp. 1-3.

U.S. Patent and Trademark Office, "Final Office Action", "U.S. Appl. No. 12/234,331", Apr. 9, 2012, pp. 1-20.

U.S. Patent and Trademark Office, "Office Action", "U.S. Appl. No. 12/234/331", Nov. 21, 2011, pp. 1-23.

Dunik et al., "Systems and Methods for Evaluating Plane Similarity", "U.S. Appl. No. 13/242,701, filed Sep. 23, 2011", pp. 1-43.

Haag, "Implementation of a Flash-LADAR Aided Inertial Navigator", May 5, 2008, pp. 560-567, Publisher: IEEE.

Meier et al., "Object Detection and Tracking in Range Image Sequences by Separation of Image Features", "IEEE International Conference on Intelligent Vehicles", Oct. 1998, pp. 280-284.

Pauly et al., "Uncertainty and Variability in Point Cloud Surface Data", "http://www.agg.ethz.ch/publications/journal_and_conference/#2004", 2004, pp. 1-8, Publisher: Symposium on Point-Based Graphics.

Pfister, "Multi-scale Point and Line Range Data Algorithms for Mapping and Localization", "Proceedings of the 2006 IEEE International Conference on Robotics and Automation", May 15, 2006, pp. 1159-1166, Publisher: IEEE.

Roncella, "Extraction of Planar Patches From Point Clouds to Retrieve Dip and Dip Direction of Rock Discontinuities", Sep. 12, 2005, pp. 162-167, vol. 3.

Schnabel, "Efficient RANSAC for Point-Cloud Shape Detection", "Computer Graphics Forum", Jun. 2007, pp. 214-226, vol. 26, No. 2, Publisher: Blackwell Publishing.

Ujit De Haag et al., "Implementation of a Flash-LADAR Aided Inertial Navigator", "Position, Location and Navigation Symposium", May 5-8, 2008, pp. 560-567, Publisher: 2008 IEEE/ION.

Yang, "Plane Detection in Point Cloud Data", "Technical Report Nr. 1, 2010", Jan. 25, 2010, pp. 1-16, Publisher: Institute of Geodesy and Geoinformation, University of Bonn.

* cited by examiner

SYSTEMS AND METHODS FOR EXTRACTING PLANAR FEATURES, MATCHING THE PLANAR FEATURES, AND ESTIMATING MOTION FROM THE PLANAR FEATURES

BACKGROUND

Typical vision-based navigation systems identify simple uniquely identifiable objects (commonly referred to as features) in a 2D image (typically an intensity image). These features and their position within the image are used for further processing, such as more complex object detection or motion estimation. In most cases, such features identified are point features. Point features are uniquely identifiable points present in a scene. One example of a point feature is a vertex of a cube. The features identified within an image may be used to estimate motion. To estimate motion from the identified features, the features from one image are matched (e.g., by correlation) to features in another image of the same scene. The difference in location of the features between the images is used to determine the motion between the images.

Point feature based approaches work well for some images. For example, point feature based approaches are a commonly used when dealing with standard intensity images and infrared images. Point feature based approaches, however, do not perform as well with images containing 3D data.

For example, one apparatus used to capture images containing 3D data is a Light Detection and Ranging (LiDAR) sensor. LiDAR sensors obtain a two-dimensional (2D) range grid for a scene by obtaining range information at each point of a 2D grid. The range information within the range grid can then be used to generate three-dimensional (3D) coordinates for each obtained point (sample) of the range grid.

There have been attempts to apply 2D point feature detectors used with 2D intensity images to LiDAR images. For example, the detector portion of Scale-invariant Feature Transform (SIFT), the detector portion of Speeded Up Robust Features (SURF), and the Harris Corner Detector have all been attempted to be applied on LiDAR images. Also, attempts have been made to identify features based on a set of 3D coordinates. For example, a vertex of a table may be identified as a point feature by detecting a change in gradient in the vertical and horizontal direction from a point on the range grid. Point features, however, can be difficult to analyze from LiDAR images and sets of 3D coordinates. The 2D range grids typically have insufficiently few identifiable point features to reliably estimate the motion. Moreover, many of the point features are unstable due to surface discontinuity generated by occluding objects.

SUMMARY

The above mentioned problems and other problems are resolved by the present invention and will be understood by reading and studying the following specification.

In one embodiment a method of controlling an actuator based on a set of three-dimensional (3D) data points is provided. The method includes obtaining a first set of 3D data points for a scene and a second set of 3D data points for a scene with a sensor. At least a first set of planar features is extracted from the first set of 3D data point. At least a second set of planar features is extracted from the second set of 3D data points. A motion is determined between the first set of 3D data points and the second set of 3D data points based on a rotation and a translation from the at least a first set to the at least a second set. At least one actuator is controlled based on the motion.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments of the present invention.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Figure 1:
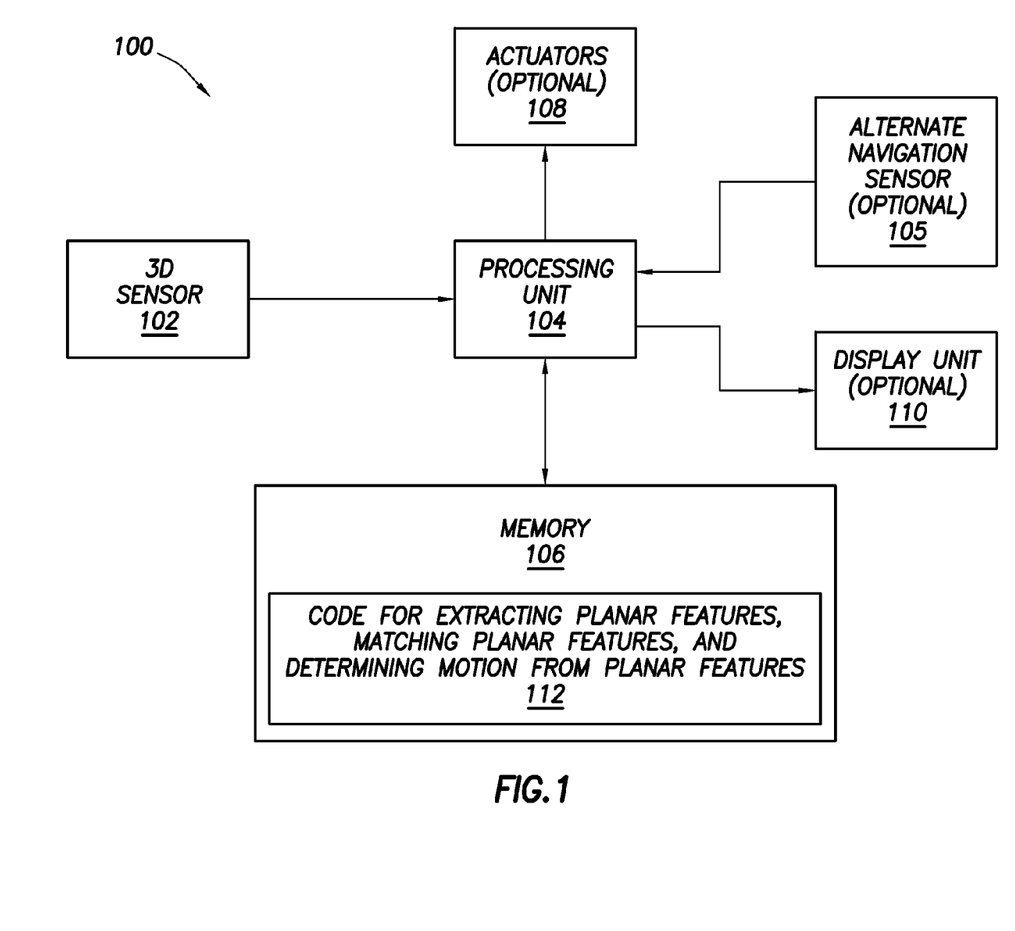
FIG. 1 is a block diagram depicting one embodiment of a system for extracting planar features, and determining motion from the planar features.

FIG. 1 is a high level block diagram depicting one embodiment of a system 100 for extracting and matching planar features, and for determining motion from the planar features. In this embodiment, system 100 is a navigation system for a vehicle. In other embodiments, system 100 is configured in a different manner and/or with different components. Here, system 100 includes a sensor 102 coupled to a processing unit 104. Sensor 102 is operable to provide 3D data points which represent a scene to processing unit 104. As used herein, the term "scene" refers to a real life place at a given moment in time. In one embodiment, the data points collected by sensor 102 comprise a three dimensional (3D) point cloud or a 2D depth map that includes range data. Range data indicates the distance from the sensor to a given point in the scene. In one embodiment, sensor 102 is a 3D scanning or flash LiDAR camera such as the Swissranger SR-3100 manufactured by Mesa Imaging AG. In another embodiment, sensor 102 is a millimeter wave radar. In yet another embodiment, sensor 102 comprises a radar and a electro-optical camera. In other embodiments, other combinations of sensors are used.

Processing unit 104 uses the 3D data points provided by sensor 102 to identify planar features in the scene. To identify and extract planar features from the 3D data points, processing unit 104 executes code 112 stored in memory 106. Processing unit 104 performs methods 300, 313, 400, 500, and/or 550 based on instruction provided in code 1 12. More detail regarding methods 300, 313, 400, 500 and/or 550 and code 112 are provided below.

Figure 2:
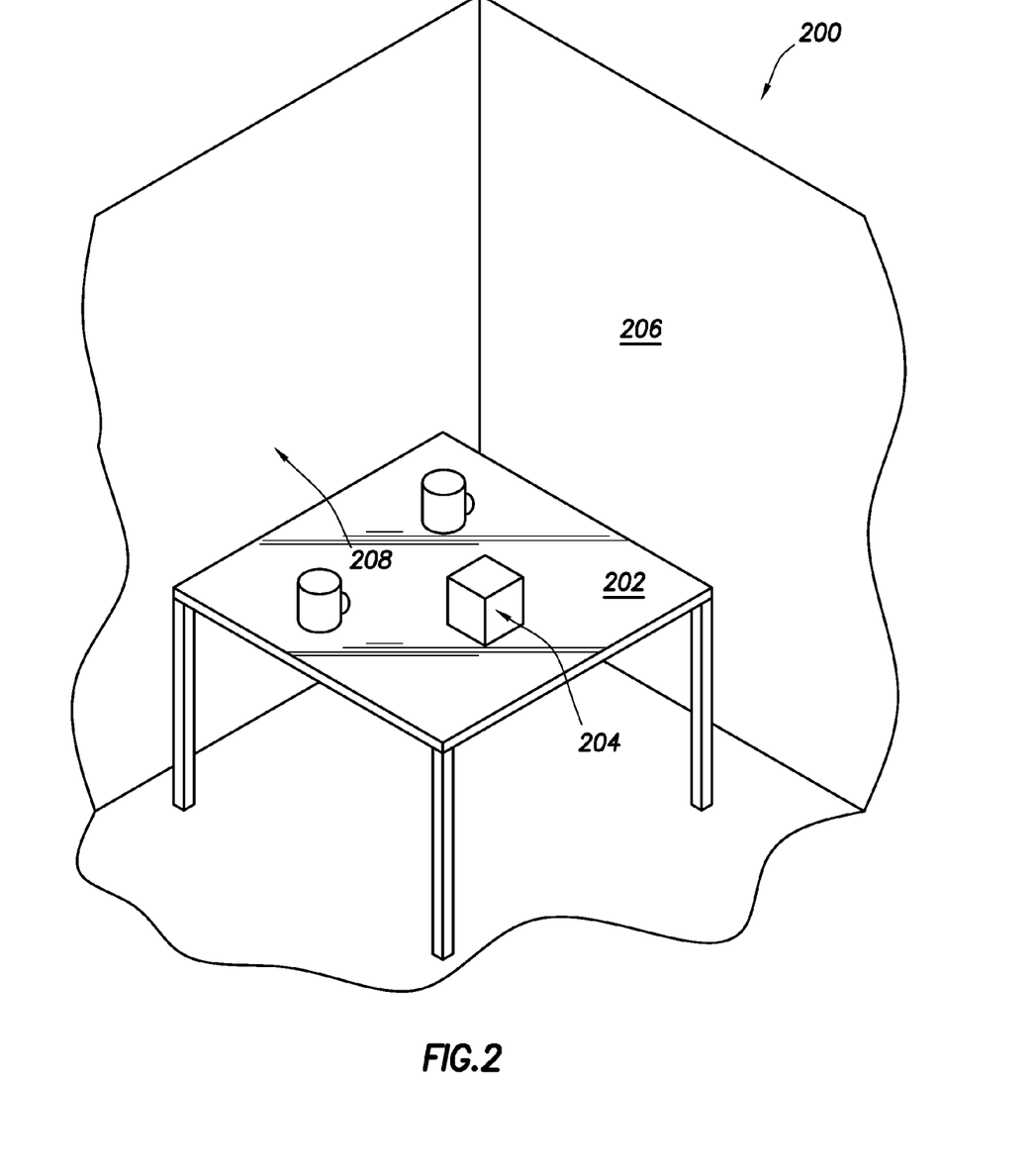
FIG. 2 depicts one embodiment of a scene showing a plurality of planar features.

FIG. 2 illustrates one example of a scene 200 from which planar features can be identified by system 100. In particular, FIG. 2 depicts a plurality of objects within scene 200. As shown in FIG. 2, a plurality of planar features 202, 204, 206, and 208 have been identified within scene 200. Each planar feature 202, 204, 206, 208 corresponds to a plane on an object within scene 200. For example, plane 202 corresponds to a top of a table. Similarly, plane 204 corresponds to a side of a box. Plane 206 corresponds to a wall of a room and plane 208 corresponds to another wall of the room. System 100 identifies planar features 202, 204, 206, and 208 in scene 200 based on the 3D data for scene 200 obtained by sensor 102.

Figure 3:
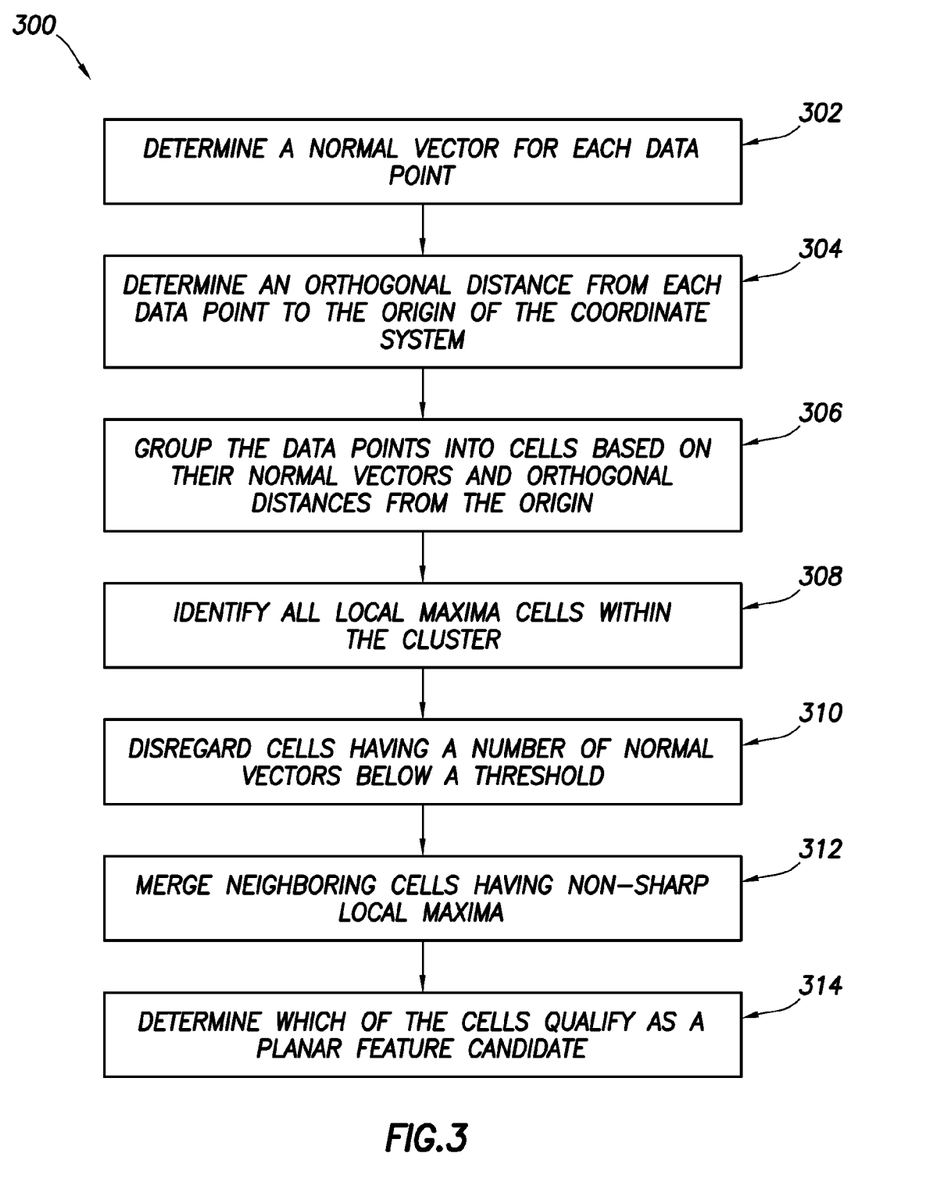
FIG. 3 depicts one embodiment of a method for identifying a planar feature from 3D data of a scene.

FIG. 3 illustrates one embodiment of a method 300 for identifying a planar feature from a set of 3D data points. As referred to herein a "set" of 3D data points refers to all the data points from a single capture of a scene by sensor 102. Thus, for example, a first set of 3D data points comprises all the data points obtained at a first time for a scene from a first point of view, and a second set of 3D data points comprises all the data points obtained at a second time and/or at a second point of view for the scene.

In one embodiment, the data points obtained from sensor 102 are in the form of a two-dimensional (2D) range grid where each data point in the grid is identified by the indices (i,j). Each data point comprises data representing a range value for a scene at the data point. In one embodiment, the data points also comprise a grayscale shade or color of the scene at the data point. In other embodiments, other additional data is included in each data point including temperature information or light reflectivity. It should be noted that sensors 102 that provide range data, such as a LiDAR, typically obtain range data in spherical coordinates (i.e. a horizontal angle, vertical angle, and distance). Thus, in some embodiments the spherical coordinate system based range data is converted to Cartesian coordinates, either by sensor 102 or by processing unit 104. In particular, the data u at each point p is converted to an [x,y,z] representation in which x=$f1$(i, j), y=$f2$(i, j), and z=$f3$(i, j), where i, and j are the indices of the data point p (thereby corresponding to the spherical angles of the original data) on which functions $f1$, $f2$, and $f3$ are performed. In an alternative embodiment, the calculations that follow are adapted to spherical coordinates.

A planar feature is identified by finding a set of contiguous points, from the 3D data points, in which both the locally estimated normal vector at each point is pointing in approximately the same direction (i.e. the orientation of a surface element at each point is approximately the same), and the orthogonal distance of a surface element at each point from the origin of the coordinate system is approximately the same. This is explained in more detail below.

Figure 6A:
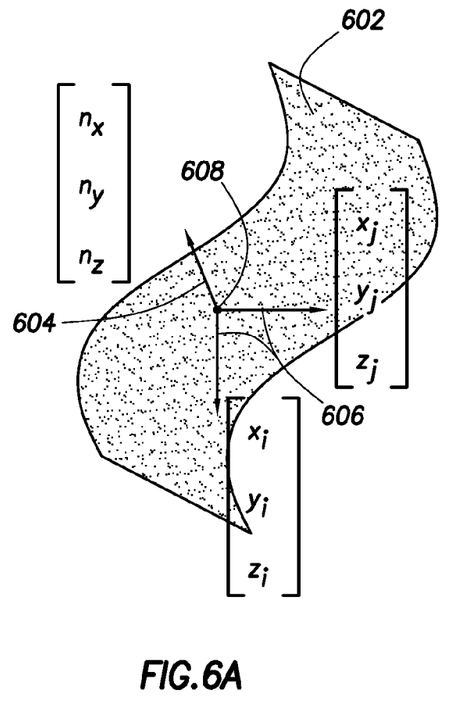
FIG. 6A depicts an example of a normal vector and tangential vectors at a point on a surface.

To identify a planar feature from 3D data points, a normal vector is determined at each data point (302). FIG. 6A illustrates one example of a surface 602 within a set of 3D data points. FIG. 6A illustrates one normal vector 604 and two tangential vectors 606 for a data point 608 on surface 602. Normal vector 604 is a vector that is orthogonal to surface 602 at data point 608.

For explanation purposes, the following description is in terms of determining a normal vector for a single data point (referred to as the "data point of interest"). It should be understood, however, that normal vectors are determined for multiple data points within the set of 3D data points. For example, in one embodiment, normal vectors are determined for all data points. In other embodiments, a multi-scale approach is taken and the normal vectors are determined for all of the points at multiple scales.

In order to determine a normal vector for the data point of interest, a small plane is robustly fit to a region of data points surrounding the data point of interest and the plane is used to estimate a normal vector for the data point of interest. The term "mask" is used to refer to a region of data points surrounding the data point of interest. For example, in one embodiment, a 5×5 mask of data points is used to determine a normal vector for the data point of interest. The 5×5 mask is a plurality of adjacent data points measuring up to 5 data points in the "i" direction and up to 5 data points in the "j" direction. The data point of interest is the center of the mask. Thus, for a given data point, the mask includes data points surrounding and including the data point. For example, a 5×5 mask includes two rows of data points on each side of the data point of interest. In other embodiments, other mask sizes are used, including, but not limited to 3×3 masks and 7×7 masks. In yet other embodiments, other shaped masks are used, such as circular or cross shaped masks.

In one embodiment, two different tangential vectors are determined for the mask surrounding the data point of interest. In one embodiment, the two tangential vectors are based on a gradient determined across the mask. The tangential vectors are determined based on partial derivatives of the x, y, and z in both the "i" and "j" directions across the mask. A first tangential vector [$x_i$, $y_i$, $z_i$] for the pixel (i, j) is determined as a partial derivative for the data point in the "i" direction of the mask. A second tangential vector [$x_j$, $y_j$, $z_j$] is determined as a partial derivative for the data point in the "j" direction of the mask. These tangential vectors are different, because they are determined in orthogonal directions, notably the "i" and "j" directions. These two different vectors define a plane fit to the data points for the mask.

From the two vectors a normal vector is determined for the mask (302). The normal vector for the mask is then used as the normal vector for the data point of interest. In one embodiment, processing unit 104 calculates the normal vector for the data point in the mask by calculating cross-products of the tangential vectors with standard equations as shown below:

$$n_x = y_i z_j - y_j z_i$$

$$n_y = z_i x_j - z_j x_i$$

$$n_z = x_i y_j - x_j y_i$$

This determines the normal vector [$n_x$, $n_y$, $n_z$] for the data point corresponding to the Cartesian point [x, y, z]. In one embodiment, to accurately compare normal vectors of different data points, the normal vectors are normalized and oriented toward the origin. As used herein the origin refers to the coordinate origin, in other words, the origin is the data point representation at [0,0,0]. In one embodiment, the origin is located at the optical center of the camera used to obtain the 3D data points. In some embodiments, the normal vector is estimated by other methods, including local least squares. Local least squares determines the normal vector by minimizing $$\sum_{[x,y,z] \in mask} (n_x x + n_y y + n_z z - d)^2,$$

where d is set arbitrarily.

Figure 6B:
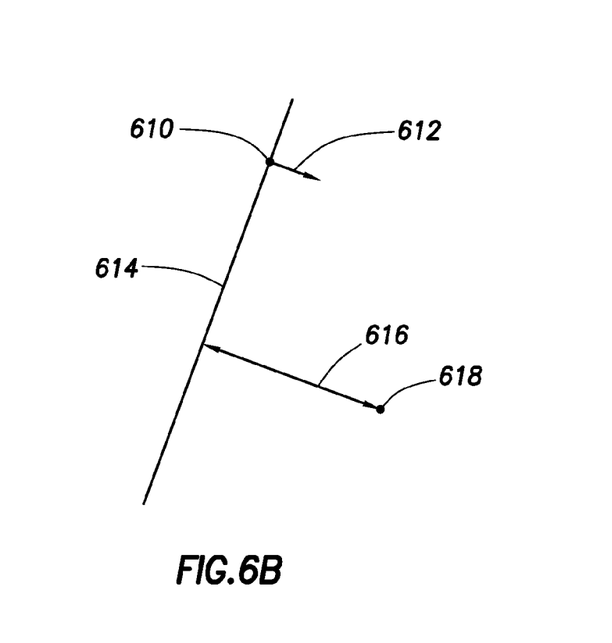
FIG. 6B depicts an example of the orthogonal distance between a plane and the coordinate origin.

Next, the orthogonal distance "d" of each data point (i, j) from the origin is determined (304). The orthogonal distance "d" is the shortest geometrical distance from a plane passing through the data point and having a normal vector equal to the normal vector of the data point, to the origin of the coordinate system. One example of an orthogonal distance is illustrated in FIG. 6B. As shown, a data point 610 having a normal vector 612 corresponds to a plane 614 having the same normal vector 612. FIG. 6B illustrates an orthogonal view of plane 614, thus, plane 614 appears as a line. The orthogonal distance from data point 610 to coordinate origin 618 is the shortest distance 616 from plane 614 to the coordinate origin 618. To explain orthogonal distance another way, the orthogonal distance "d" of a data point is the distance from the data point to a plane extending through the origin and having a normal vector the same as the normal vector determined for the data point.

The orthogonal distance for each data point is estimated (304) using the same mask used in block 302 for the respective data point. Thus, in the embodiment described above where a 5×5 mask is used to determine the tangential vectors, a 5×5 mask is used to determine the orthogonal distance for the data point of interest. In one embodiment, the orthogonal distance "d" is calculated according to the following equation:

$$d(i,j) = \left( \begin{bmatrix} n_x \\ n_y \\ n_z \end{bmatrix}, \frac{1}{25} \sum_{k=-2}^{2} \sum_{l=-2}^{2} \begin{bmatrix} x \\ y \\ z \end{bmatrix} (i+k, j+l) \right),$$

where $(\cdot,\cdot)$ denotes an inner product and the normal vector $[n_x, n_y, n_z]$ has been normalized. In this way, the orthogonal distance is determined for each data point.

In one embodiment, the normal vector and orthogonal distance for each data point are used to represent the data point in a spherical coordinate system. To represent the data point in spherical coordinates, each normal vector is represented as two spherical angles and the radius, $[\theta, \phi, \rho]$. $\theta$ and $\phi$ are adjusted (if necessary) such that the spherical vector lies in the interval $(-\pi/2, \pi/2)$. When $\theta$ and $\phi$ are adjusted, the corresponding orthogonal distance d is also adjusted by multiplying the orthogonal distance d by $-1$. Additionally, since the normal vector has been normalized $\rho$ is always equal to 1. $\theta$ and $\phi$ along with the orthogonal distance are then used to represent each data point as $\theta(i,j)$, $\phi(i,j)$, and $d(i,j)$.

Once the normal vector and the orthogonal distances are computed for each data point, the data points are grouped into cells (306). A cell is formed by grouping together data points having similar normal vectors and orthogonal distances. In one embodiment, the data points are grouped into cells based on step values of the normal vector and orthogonal distance of each data point. For example, in one embodiment, data points are grouped based on step values of $\theta$, $\phi$, and d, such that $\theta$ and $\phi$ steps are set at angles of 3° ($\pi/60$) and orthogonal distance d is set at steps of 0.1 m. Thus, for example, one cell would include vectors having $\theta$ angles from 30-33°, $\phi$ angles from 57-60°, and orthogonal distances between 6-6.1 meters. The angles $\theta$ and $\phi$ are grouped taking into account that the angles are periodic. Thus, for example, $\theta$ and $\phi$ angles of $\pi/2$ and $-\pi/2$ are placed in the same cell. As an example, for $\theta$ and $\phi$ steps set at angles of 3° ($\pi/60$) and orthogonal distance d set at steps of 0.1 m, and when 3D data points are captured with the Swissranger SR3100 flash LiDAR, the total resulting cell has dimensions of 60×60×75. This is determined from $\pi/(\pi/60)=60$ and $7.5/0.1=75$. 7.5 m is a maximum range the Swissranger SR3100 is capable of measuring under its default frequency settings. In other embodiments, other step sizes are used to group the data points into cells.

Figure 7:
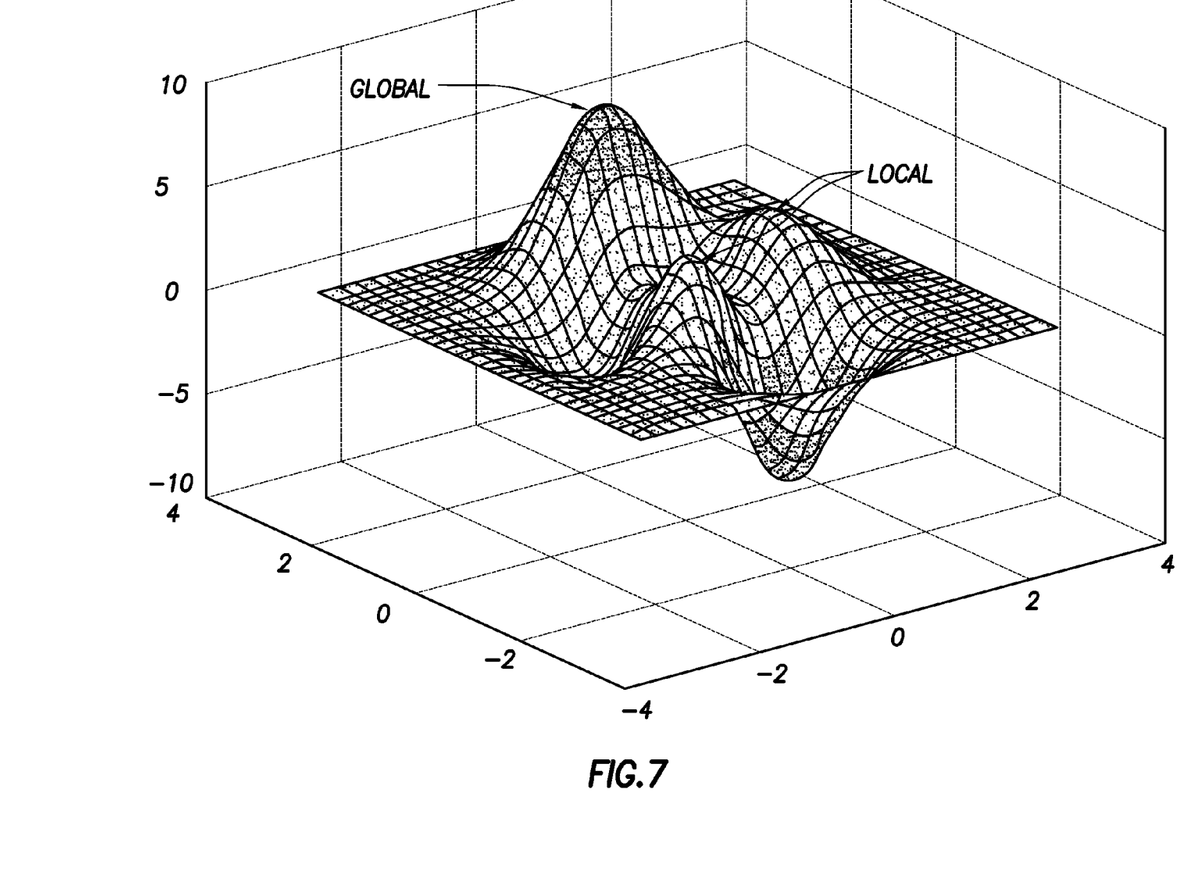
FIG. 7 depicts a global maximum and local maxima.

Next, each of the cells is analyzed to determine which cells are non-sharp local maxima cells (308). FIG. 7 is a three-dimensional graphical illustration of local maxima and global maximum on a 2D function. As shown a (non-sharp) local maxima corresponds to points where the value of the function is greater (or equal to) any other value of the function in some small neighborhood of the point. The (non-sharp) global maximum is a point where the value of the function is greater (or equal to) any other value of the function.

In the case of 3D cluster of cells, we define the function F whose local maxima is searched for F(cell)=number of data points within cell. A (non-sharp) local maxima corresponds to a cell or cells containing greater (or equal) number of data points as compared with other cells within their neighborhood. Likewise, a global maximum is a special case of a local maximum that corresponds to a cell containing a maximum number of data points in the entire cluster.

In an ideal case, a plane would lie with a single cell, since all the plane's points would have the same normal vector and orthogonal distance. Real data, however, contains noise. Thus, point parameters (normal vector and orthogonal distance) are spread around the ideal value. In theory, these point parameters are spread around in a Gaussian like distribution. Thus, to find a plane, the ideal plane value is searched for by looking for a peak (local maximum) in the distribution.

To determine whether a cell is a local maximum, the numbers of data points within each cell is determined. The cells with the largest number of data points in their "local" area are considered local maxima cells. To determine the local maxima, the cluster is periodically padded by 2 data cells on each side in the $\theta$ and $\phi$ dimensions to compensate for the periodicity of the angles, since a planar feature corresponding to $\theta$ or $\phi=\pi/2$ corresponds also to $\theta$ or $\phi=-\pi/2$. The number of data points within each cell is then identified in a sliding 5×5×5 mask. Only maxima which lie in the original non-padded cluster are considered to be local maxima. Padding of the cluster and using only maxima within original non-padded cluster ensures that a planar feature periodically spread from maximum to minimum $\theta$ and $\phi$ angles is detected only once. In other embodiments, different sliding mask sizes can be used and the number of cells used to periodically pad the cluster is adjusted accordingly. The number of cells to pad the cluster is at least the maximum integer number smaller or equal to half of the sliding mask's size.

Both sharp and non-sharp local maxima are used for further processing in method 300. A cell x with a number of data points |x| is a non-sharp local maximum when there exists a neighborhood of x, $N_x$, such that $\forall y \in N_x$, $|x| \geq |y|$. A cell x with a number of datapoints |x| is a sharp local maximum when there exists a neighborhood of x, $N_x$, such that $\forall y \in N_x$, $|x| > |y|$.

In one embodiment, cells having a number of data points below a certain threshold are disregarded (310). Cells consisting of a low number of data points are likely either noise, or come from planar features too small to be reliably identified, thus, these cells are disregarded. In one embodiment, the threshold cell size is 6 data points, thus cells having less than 6 data points are disregarded. In other embodiments, other cell threshold sizes are used.

In one embodiment, two cells that are a non-sharp local maximum within an immediate proximity of one another are merged together into a single cell (312). For example, in one embodiment, local maxima cells adjacent to each other in a 3×3×3 mask are merged together as a single cell. In other embodiments, other mask shapes and sizes are used. Additionally, periodicity in the θ and φ angles is taken into account in order to determine when to merge nearby local maxima. Thus, as mentioned above for example, θ and φ angles of −π/2 and π/2 may be merged together as a single cell.

Next, processor 104 determines which cells qualify as planar feature candidates (314). A cell qualifies as a planar feature candidate when a number of data points associated with the cell is equal to or above a threshold. Similar to block 310, cells having a number of data points below a certain threshold are disregarded. For example, in one embodiment, a cell having less than 10 data points are disregarded. In other embodiments, other thresholds are used. The threshold for a single cell here is higher than the one used at block 310, since non-unique maxima have been merged into a single cell. In some embodiments, processor 104 keeps track of the data points corresponding to each of the cells during the determination of planar feature candidate.

In one embodiment, planar feature candidates are considered to be an extracted planar feature without any further processing. Thus, in this embodiment, each cell that meets the threshold of block 314 comprises an extracted planar feature.

Figure 4:
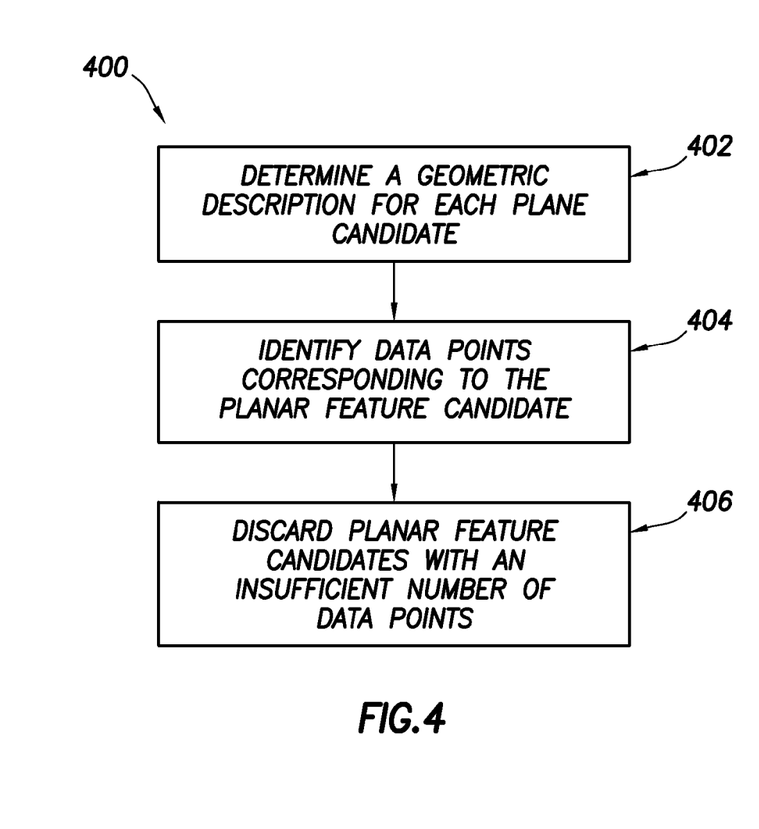
FIG. 4 depicts one embodiment of a method for refining a planar feature.

Referring now to FIG. 4, a method 400 for refining a planar feature candidate is shown. Once processor 104 determines planar feature candidates from the cells, a geometric description is determined for each planar feature candidate (402). In one embodiment, a geometric description for a planar feature candidate is a normal vector for the planar feature candidate and the planar feature's orthogonal distance from the origin. For example, in one embodiment, the normal vector and orthogonal distance for each data point associated with a planar feature candidate is averaged to determine a single normal vector and orthogonal distance to describe the planar feature candidate.

In another embodiment, a least squares estimation of the normal vector and the orthogonal distance is performed based on the Cartesian 3D data points [x, y, z] associated with a planar feature candidate. Least squares are used to estimate the normal vector for a planar feature candidate. To perform the least squares estimation, the orthogonal distance is pre-set to an arbitrary non-zero number. In one embodiment the orthogonal distance is pre-set to 1. In certain cases, the least squares estimation becomes numerically unstable. This problem is well known and commonly alleviated by using, for example, SVD decomposition or Choleski factorization. In one embodiment, both the normal vector and the pre-set orthogonal distance are divided by the norm of the normal vector. Furthermore, in one embodiment, the Random Sample Consensus (RANSAC) algorithm is used to reject outliers when combining the Cartesian 3D data points [x, y, z] associated with a planar feature candidate. For example, in one embodiment, when performing the least squares fitting, if N data points are associated with a particular planar feature candidate, the RANSAC variables are set as follows: d is set equal to 1 and maximally L=1000 subsets are generated, each subset consisting of M=max(3, round(N/3)) data points. Then, for each subset of M data points, the least squares estimation is used solve the equation $$(\forall\, (i, j) \in M) \left( \left\langle \begin{bmatrix} x(i, j) \\ y(i, j) \\ z(i, j) \end{bmatrix}, \begin{bmatrix} n_1 \\ n_2 \\ n_3 \end{bmatrix} \right\rangle \right) = d$$

for n=[$n_1, n_2, n_3$]. The normal vector n is then normalized, and d is adjusted accordingly by dividing by the original (prior to normalization) norm of the normal vector n. More details regarding the RANSAC algorithm are provided in the article "Random Sample Consensus: A Paradigm for Model Fitting with Applications to Image Analysis and Automated Cartography" by M. A. Fischler, and R. C. Bolles, *Comm. Of the ACM* 24: pg. 381-395, June 1981 which is hereby incorporated herein by reference.

In any case, the result of the geometric description is a normal vector and orthogonal distance describing the planar feature candidate. A geometric description is generated for all planar feature candidates.

Once geometric descriptions are determined for all planar feature candidates, processor 104 determines which data points in the set of 3D data points lie on the plane defined by each description (404). Each data point in the set of 3D data points is compared to each planar feature candidate from the set of 3D data points to determine if the particular data point lies on the plane defined by the planar feature candidate. To determine which data points lay on a particular plane, the inner product of each data point and the normal vector describing the planar feature candidate is computed. This number is then subtracted from the orthogonal distance of the planar feature candidate from the origin. A data point is considered to lie on the candidate planar feature if the difference between the inner product and the orthogonal distance is within a certain margin. For example, in one embodiment, a data point is considered to lie on a plane of a planar feature candidate when the inner product of the data point and the normal vector for the candidate planar feature subtracted from the orthogonal distance of the normal vector from the origin is less than 0.03 m as shown in the following equation:

$$\left| \left( \left\langle \begin{bmatrix} x(i, j) \\ y(i, j) \\ z(i, j) \end{bmatrix}, \begin{bmatrix} n_1 \\ n_2 \\ n_3 \end{bmatrix} \right\rangle \right) - d \right| \leq 0.03.$$

Additionally, in one embodiment, for a data point to be considered to lie on a plane, the normal vector for the data point also must be similar to the normal vector for the planar feature candidate. For example, in one embodiment, the inner product of the normal vector for the data point and the normal vector for the planar feature candidate must be more than or equal to 0.90 as shown in the following equation:

$$\left\| \left\langle \begin{bmatrix} n_x(i, j) \\ n_y(i, j) \\ n_z(i, j) \end{bmatrix}, \begin{bmatrix} n_1 \\ n_2 \\ n_3 \end{bmatrix} \right\rangle \right\| \geq 0.90.$$

In this way the data points corresponding to a particular planar feature candidate are determined.

A planar feature candidate and its associated data points are considered to be an extracted planar feature if the planar feature candidate has at least a threshold number of data points associated therewith (406). For example, in one embodiment a planar feature candidate is considered to be a planar feature when the planar feature candidate has at least 80 data points associated therewith. Planar feature candidates that do not have the threshold number of data points associated therewith are discarded. Planar feature candidates that do have a threshold number of data points associated therewith are considered planar features.

In some embodiments, morphological refinement and merging of the planar features are conducted by processor 104. Morphological refinement attempts to smooth a planar feature and the merging process merges similar planar features into a single planar feature. For example, in one embodiment, prior to excluding a planar feature for lack of a threshold number of data points, the planar feature candidate and the data points therewith is eroded with a 4×4 mask to remove isolated artifacts. Then, processor 104 determines whether the planar feature candidate has enough associated data points to meet the threshold. If the planar feature candidate has enough associated data points, the planar feature is then dilated with a 7×7 mask to close internal single data point holes. Once this has been completed for all planar feature candidates, processor 104 determines if any of the remaining planar features should be merged. In one embodiment, any two planar features that overlap by at least two third of the area of either planar feature are merged together. The merging is recursively repeated until there are no planar features left to merge. In another embodiment, merging is performed without application of morphological operations. Either one, both, or neither of merging and morphological refinement may be performed by processor 104 to refine an extracted planar feature from an image.

Some, none, or all of the steps described in blocks 402, 404, and 406 may be performed by processor 104 to refine an extracted planar feature from an image. In embodiments, where less than all of steps 402, 404, and 406 are used, the planar feature candidate is considered an extracted planar feature once the final step of the particular embodiment is completed.

Regardless of the level of refinement of an extracted planar feature, there are many applications for a planar feature. For example, in one embodiment, planar features extracted from successive images are matched in order to estimate motion between the two images. In this embodiment, processing unit 104 estimates motion by matching extracted planar features from a first set of 3D data points to corresponding extracted planar features from a previous set of 3D data points stored in a memory 106.

Figure 5A:
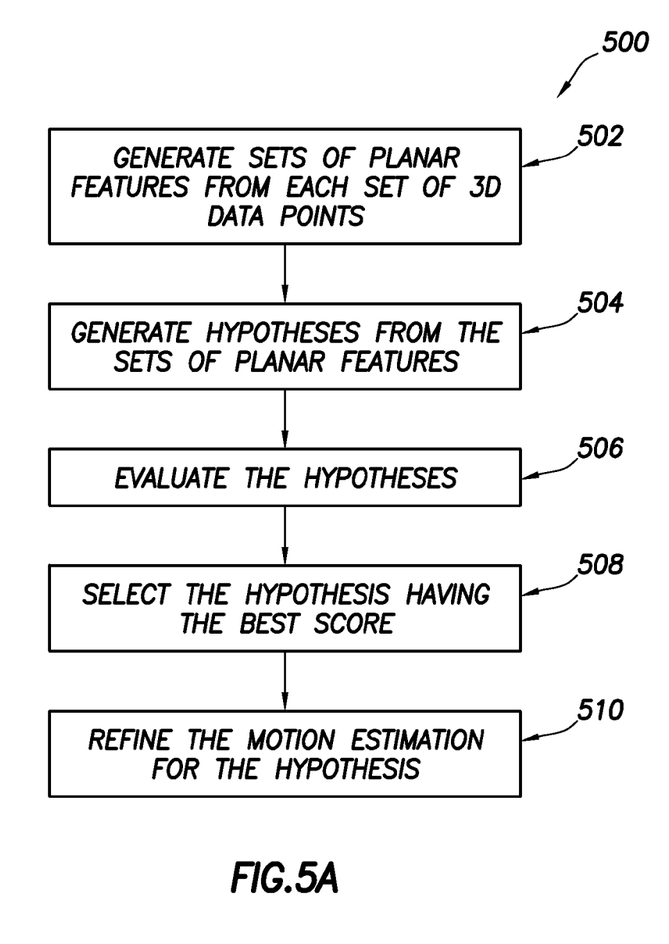
FIG. 5A depicts one embodiment of a method for determining motion based on extracted planar features from each of two sets of 3D data of a scene.

FIG. 5A illustrates one embodiment of a method 500 for determining motion from planar features. Method 500 estimates motion by comparing location information of planar features extracted from a first set of 3D data points to location information of planar features extracted from a second set of 3D data points. For example, in one embodiment, the first set of 3D data points is obtained by sensor 102 at a first time from a moving vehicle. The second set of 3D data points is obtained by sensor 102 at a second time from the moving vehicle. Thus, the extracted planar features are used to determine the motion of the moving vehicle. In one embodiment, the planar features are extracted from the second set of 3D data points using the same method characteristics as the planar features are extracted from the first set of 3D data points. In an alternative embodiment, different method characteristics are used to extract the second set of 3D data points than is used to extract the first set of 3D data points.

For motion estimation, a group of planar features from the first set of 3D data points are matched to a group of planar features from the second set of 3D data points. Prior to matching the planar features, however, the group of planar features from each set of 3D data points that is to be used for motion estimation is determined (502). Each planar feature in a group of planar features is selected to be sufficiently independent of each of the other planar features within the group. For example, in a group of three planar features (referred to herein as a triplet) each of the three planar features is sufficiently independent of the other two planar features. For simplicity, the following description of motion estimation is described with respect to matching three planar features from the first set of 3D data points to three planar features from the second set of 3D data points. It should be understood, however, that in other embodiments, other number of planar features are matched, including pairs, quadruplets, quintuplets, and others. Typically, the more planar features used to determine motion, the more reliable the calculation, however, more planar features also typically increases processing requirements. A pair of planar features may be matched if only rotation (and not both rotation and translation) is to be determined.

To generate a triplet, planar features are analyzed to determine whether the planar feature belongs to a group of three planar features that satisfies the following relational criteria: denoting $n_1$, $n_2$, and $n_3$ to be unit-length normal vectors for each of the three planar features respectively, the three planar features are selected such that the triple product $((n_1 \times n_2)' n_3)$ of their normal vectors is greater than a given threshold. Having a triple product above a certain threshold ensures that the normal vectors for each plane are linearly independent, that the mutual angles for the normal vectors are above certain threshold, and that the normal vectors point in three different directions.

Each planar feature in a set of 3D data points is analyzed to determine if that planar feature forms a triplet with any other planar features within that set of 3D data points. All combinations of three planar features for a set of 3D data points are input into the above criteria. Planar features are compared only to planar features within their set of 3D data points. In other words, to meet the criteria above, a planar feature must be sufficiently independent of at least two other planar features extracted from the same set of 3D data points. The planar features that belong to a triplet are used for further processing in method 500. In one embodiment, a triple product of at least 0.333 is required for unit-length normal vectors of the three planar features.

Once all possible triplets have been determined for both sets of 3D data points, hypotheses are generated (504) to determine matches of triplets from the first set of 3D data points with triplets from the second set of 3D data points. Each hypothesis assigns a triplet in the first set of 3D data points to a triplet in the second set of 3D data points. A hypothesis is an assumption that assigned triplets correspond to matching planar features. In other words, a hypothesis assigning triplet B from the second set of 3D data points to triplet A from the first set of 3D data points assumes that the planar features corresponding to triplet B match the planar features corresponding to triplet A (after the planar features have been rotated and translated).

As referred to herein a "match" of a planar feature or features from one set of 3D data points with a planar feature or features from another set of 3D data points refers to the situation where a plane on an object in the scene captured by the first set of 3D data points corresponds to the same plane on the object in the scene captured by the second set of 3D data points. For example, a surface on a table in a first set of 3D data points would match with the same table surface in a second set of 3D data points, even if the second set of 3D data points was obtained from a different angle than the first set of 3D data points. Although a match cannot be achieved with 100% accuracy, determining a match attempts to determine when the above situation exists.

Referring back to the generated hypothesis, the triplets in each hypothesis are analyzed to determine whether their corresponding planar features match. For every two triplets (3 planar features each), 6 hypotheses are generated since each matching combination of two planar features is considered as a separate hypothesis. For example, having a first triplet of planar features $P_1^1, P_2^1, P_3^1$ from the first set of 3D data points, and a second triplet of planar features $P_1^2, P_2^2, P_3^2$ from the second set of 3D data points, the following hypotheses are generated: $P_1^1,P_2^1,P_3^1 \sim P_1^2,P_2^2,P_3^2$, $P_1^1,P_2^1,P_3^1 \sim P_1^2,P_3^2,P_2^2$, $P_1^1,P_2^1,P_3^1 \sim P_2^2,P_1^2,P_3^2$, $P_1^1,P_2^1,P_3^1 \sim P_2^2,P_3^2,P_1^2$, $P_1^1,P_2^1,P_3^1 \sim P_3^2,P_1^2,P_2^2$, and $P_1^1,P_2^1,P_3^1 \sim P_3^2,P_2^2,P_1^2$. In another embodiment, hypotheses are generated by creating 6 combinations of planar features in the first set of 3D data points and leaving the order of the planar features in the second set of 3D data points $P_1^2,P_2^2,P_3^2$ intact.

Once the hypotheses are generated, the hypotheses are evaluated (506). Hypothesis evaluation determines how well the assigned planar features of the hypothesis match. In one embodiment, hypothesis evaluation determines a rotation "R" and a translation "T" between the planar features from the first set of 3D data points and the planar features from the second set of 3D data points in the hypothesis. Rotation R refers to the three-dimensional change in orientation between the planar features from the first set of 3D data points to the matching planar features in the second set of 3D data points. Likewise, translation T refers to the distance change of between the planar features from the first set of 3D data points to the matching planar features in the second set of 3D data points. More detail regarding hypothesis evaluation is provided below with respect to method 550 and FIG. 5B. Although in this embodiment, motion is expressed using the direct cosine matrix R and the translation vector T (as explained in method 550 below), in other embodiments, hypothesis evaluation expresses motions with other representations such as quaternions, pair of rotation matrices, or a combination of Euler angles and a translation vector.

In one embodiment, all hypotheses are evaluated, however; in other embodiments, only a portion of the hypotheses are evaluated. In one embodiment where only a portion of the hypotheses are generated, hypotheses are selected for evaluation randomly by, for example, the RANSAC algorithm. In one embodiment, the evaluation ends when a hypothesis with a sufficiently good score (satisfying a given threshold) is found. When a hypothesis is evaluated, the hypothesis is either rejected initially when there is no chance that the hypothesis is correct, or a hypothesis score is calculated. In one embodiment, all possible hypotheses are generated and analyzed based on all triplets from both sets of 3D data points. In another embodiment, hypotheses are analyzed as they are generated, thus, once a successful hypothesis (having a score meeting the threshold described with respect to block 508 below) is found, no more hypotheses are generated.

Figure 5B:
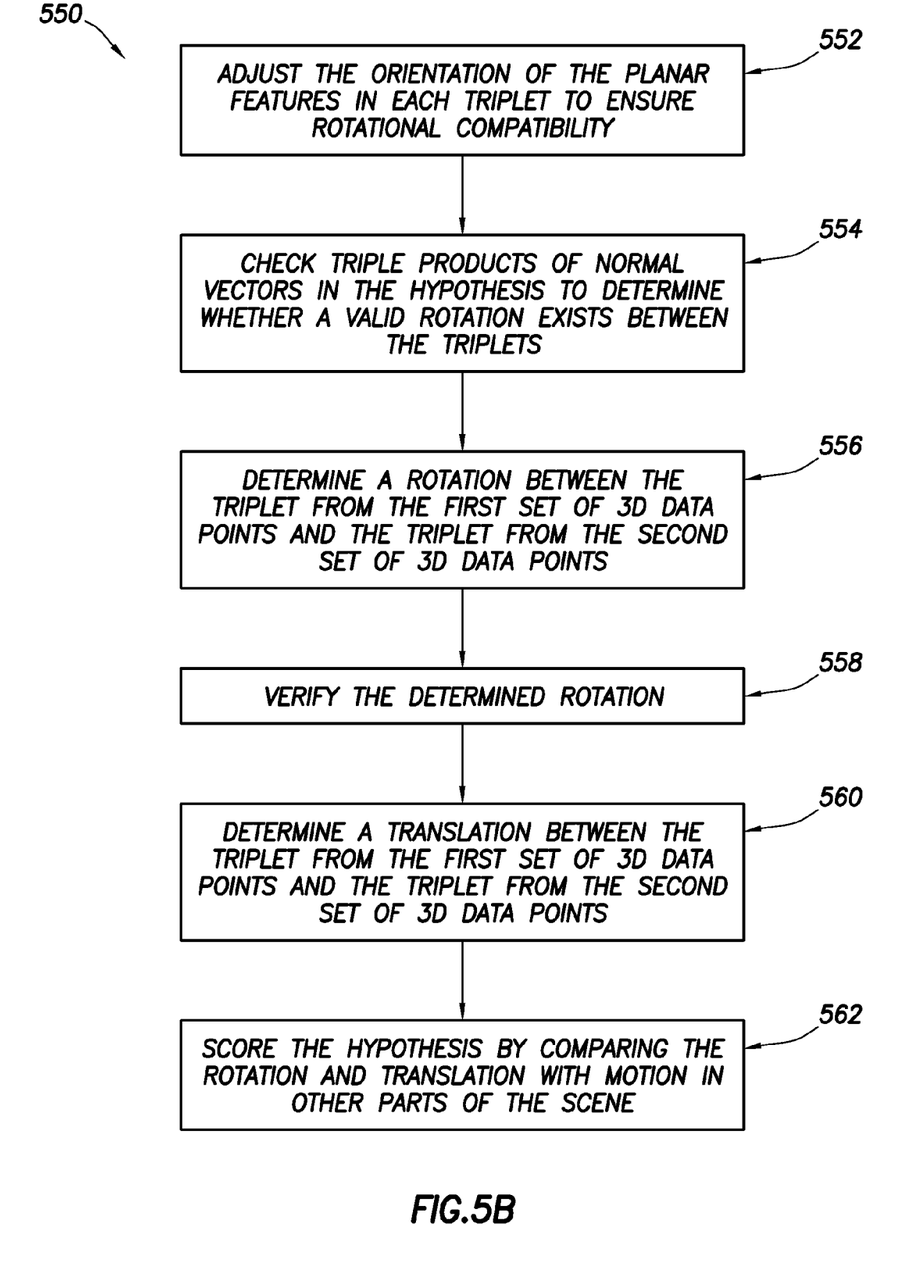
FIG. 5B depicts one embodiment of a method for evaluating a hypothesis of matched planar features.

When all hypotheses to be evaluated are either rejected or scored, the best scored hypothesis is selected from among the scored hypotheses (508). For example, in one embodiment, the highest score is selected as the best one. The best score is further evaluated, to determine whether the score meets a threshold. If the score meets a given threshold, the score is accepted; otherwise the method ends and the method has failed to estimate motion from the planar features. The threshold is specific to the way the hypothesis is scored in method 550. In one embodiment, once a best scoring hypothesis is selected, the motion estimates of the rotation R and the translation T from the best scoring hypothesis are refined by taking into account other matched planar features, when other matched planar features exist (510). This may achieve more robust and stable motion estimation, however, this also increases the amount of processing required. The rotation R is refined by re-evaluating the rotation matrixes R of all matched frames using the Absolute Orientation algorithm. To refine the translation T, the matrix $$\begin{bmatrix} n_i^{2\prime} \\ n_m^{2\prime} \\ n_k^{2\prime} \end{bmatrix}^{-1}$$

is replaced with right pseudo-inversion matrix the following way: denote all matched planes $P_1^1, \ldots, P_{n_m}^1$ and $P_1^2, \ldots, P_{n_m}^2$ define the matrix $N=[n_1^2 \ldots n_{n_m}^2]$, the translation formula then has the form $$T = (NN')^{-1}N \begin{bmatrix} d_1^2 - d_1^1 \\ \ldots \\ d_{n_m}^2 - d_{n_m}^1 \end{bmatrix},$$

where $(NN')^{-1}N$ is a right pseudo-inverse matrix to the matrix N. In one embodiment, the motion model $x^2 = Rx^1 + T$ is used to describe the motion between to sets of 3D data points. This motion model determines formulas such as how rotation R and translation T are both calculated and used. In the embodiments described herein, formulas containing R and T are based on this motion model. In other embodiments, however, other motion models are used and formulas working with R and T are modified accordingly.

FIG. 5B illustrates one embodiment of a hypothesis evaluation method 550. First, the hypothesis evaluation adjusts the orientation of planar features in each triplet (if necessary) to ensure the rotation compatibility of assigned planar features in each triplet (552). A planar feature represented by a unit-length normal vector n and an orthogonal distance d, may also be represented by a unit-length normal vector −n and an orthogonal distance −d. This ambiguity complicates rotation estimation. Therefore, for any two planar features $P_i^1, P_j^2$, $P_a^b \approx (n_a^b, d_a^b)$, a=i,1, b=1,2 when $(n_i^1, n_j^2) < 0$, where $(\cdot, \cdot)$ is an inner product, the representation of planar feature $P_i^1$ is transformed the following way: $n_i^1 = -n_i^1, d_i^1 = -d_i^1$. In another embodiment, the representation of planar feature $P_j^2$ is transformed instead.

In the embodiment described above, the rotation R is assumed to be less than 90 degrees (commonly fulfilled when frames are acquired with a high frame-rate). In other embodiments, however, the rotation is not assumed to be less than 90 degrees. In such embodiments, an additional 7 hypotheses are generated. For example, assume a planar feature $P_i^1$ whose representation has been transformed by formulas $n_i^1 = -n_i^1$, $d_i^1 = -d_i^1$, as $-P_i^1$ ($P_i^1$ and $-P_i^1$ is the same planar feature, differing only in the parametric description of the feature). Having a hypothesis $P_i^1,P_j^1,P_k^1 \sim P_m^2,P_n^2,P_o^2$, the additional 7 hypotheses are $-P_i^1,P_j^1,P_k^1 \sim P_m^2,P_n^2,P_o^2$, $P_i^1,-P_j^1,P_k^1 \sim P_m^2,P_n^2,P_o^2$, $P_i^1,P_j^1,-P_k^1 \sim P_m^2,P_n^2,P_o^2$, $-P_i^1,-P_j^1,P_k^1 \sim P_m^2,P_n^2,P_o^2$, $-P_i^1,P_j^1,-P_k^1 \sim P_m^2,P_n^2,P_o^2$, $P_i^1,-P_j^1,-P_k^1 \sim P_m^2,P_n^2,P_o^2$, and $-P_i^1,-P_j^1,-P_k^1 \sim P_m^2,P_n^2,P_o^2$. In other embodiments, 7 additional hypotheses are generated by creating 7 sign-combinations of planar features in the second set of 3D data points and leaving the signs of the planar features in the first set of 3D data points $P_i^1, P_j^1, P_k^1$ intact.

In one embodiment, once the orientation of each planar feature is adjusted (if necessary) the planar features are further analyzed to determine if a valid rotation exists for the hypothesis being evaluated (554). For example, in one embodiment, a valid rotation is determined to exist when the triple products for the each of the triplets in the hypothesis is equal, i.e. $(n_i^1 \times n_j^1)' n_k^1 = (n_l^2 \times n_m^2)' n_n^2$. In an alternative embodiment, a valid rotation is determined to exist when the difference between the triple products is below a threshold, allowing for some noise in the data. When the triple products are not the same (or above the threshold), the currently evaluated hypothesis is rejected, and the evaluation of this hypothesis ends. When, the triple products are the same (or above the threshold), the hypothesis continues for further processing at block 556.

When the triple products are the same, the rotation R corresponding to hypothesis is estimated (556). In one embodiment, the rotation is determined by inputting the normal vectors of the planar features into the Absolute Orientation algorithm. More detail regarding the absolute orientation algorithm is provided in the publication "Closed-form solution of absolute orientation using unit quaternions" by B. K. P. Horn, *Journal of Optical Society of America A*, Vol. 4, Issue 4, 1987, pp. 629, which is hereby incorporated herein by reference.

In one embodiment, once a rotation is determined, the rotation is verified (558). For example, in one embodiment, the rotation is verified with the following condition: $[n_l^2 \ n_m^2 \ n_n^2] = R \cdot [n_i^1 \ n_j^1 \ n_k^1]$, where R is the rotation matrix representing the rotation determined between the two sets of planar features. Due to noise in the data, the condition is typically not fulfilled perfectly. Thus, in one embodiment, close similarity is required for each pair of corresponding vectors. In one embodiment, the similarity is measured by a vector inner product. In another embodiment, the similarity is measured by the norm of their difference. For example, in one embodiment, the norm of the difference between the normal vectors is compared with a threshold "T". For example, in one embodiment, the rotation is verified when $\max\{\|Rn_i^1 - n_l^2\|, \|Rn_j^1 - n_m^2\|, \|Rn_k^1 - n_n^2\|\} \leq T$, where T=0.015. When this condition is met, method 550 continues to block 560 with the current hypothesis. When the condition is not met, the hypothesis is rejected and the evaluation of this hypothesis ends.

Next, the translation T between the two sets of planar features is determined (560). The translation estimation is based on the following formula: for any two matched planar features $P_i^1, P_l^2, P_a^b \approx (n_a^b, d_a^b), a=i,l, b=1,2$, assuming $n_l^2 = Rn_i^1$ it holds that $n_l^{2\prime} T = d_l^2 - d_i^1$. For example, in one embodiment, for a $P_i^1, P_j^1, P_k^1 \sim P_l^2, P_m^2, P_n^2$ hypothesis, the translation T between the planar features is determined using the following equation:

$$T = \begin{bmatrix} n_l^{2\prime} \\ n_m^{2\prime} \\ n_k^{2\prime} \end{bmatrix}^{-1} \begin{bmatrix} d_l^2 - d_i^1 \\ d_m^2 - d_j^1 \\ d_n^2 - d_k^1 \end{bmatrix}.$$

When more than three planes are matched, the inverse matrix $$\begin{bmatrix} n_l^{2\prime} \\ n_m^{2\prime} \\ n_k^{2\prime} \end{bmatrix}^{-1}$$

is replaced with a right pseudo-inverse matrix.

Next, the hypothesis is scored (562). The rotation and translation estimated from the hypothesis define a motion between the two sets of 3D data points. The hypothesis is scored by comparing the rotation and translation determined for the hypothesis with motion in other parts of the scenes captured by sensor 102.

In one embodiment, to determine compatibility, other planar features not included in the currently evaluated hypothesis are analyzed to determine whether the other planar feature(s) have matching planar feature(s) with a rotation and translation equal to (or within a threshold of) the rotation and translation determined for the currently evaluated hypothesis. Here, for every planar feature from the first set of 3D data points, a transformation is computed using the rotation and translation from the hypothesis. The planar features extracted from the second set of 3D data points are then searched to determine whether there exists a planar feature from the second set of 3D data points that corresponds to the transformation. Each planar feature from the first set of 3D data points is transformed and compared to the planar features from the second set of data points. The number of planar features from the first set of 3D data points that have a corresponding planar feature in the second set of 3D data points is counted and used as the score for the hypothesis.

For example, for a planar feature $P^1$ a transformation $\hat{n}^2$ is computed using the following equation: $\hat{n}^2 = Rn^1, \hat{d}^2 = d^1 + \hat{n}^{2\prime} T$. All planar features extracted from the second set of 3D data points are searched, to determine whether there exists a planar feature $P^2$ represented by a normal vector n and an orthogonal distance d, such that either from the following statements is true:
1. n is similar to $\hat{n}^2$ and $\hat{d}^2 - d$ is close to zero ($|\hat{d}^2 - d|$ is below certain threshold).
2. n is similar to $-\hat{n}^2$ and $\hat{d}^2 + d$ is close to zero ($|\hat{d}^2 + d|$ is below certain threshold). In other embodiments, planar features $P^2$ from the second set of 3D data points are analyzed to compute their anticipated planar feature by inverse rotation and translation ($\hat{n}^1 = R'n^2, \hat{d}^1 = d^2 - \hat{n}^{2\prime} T$), and search all planar features in the first set of 3D data points in a similar manner. The score for the hypothesis is the number of planar features that match either criterion 1 or 2.

In another embodiment, LiDAR points from the first and second sets of 3D data points are used to calculate a hypothesis score. This utilizes the assumption that if the motion was estimated correctly, most of points from the first set of 3D data points, when transformed, should overlap with points from the second set of 3D data points. Thus, using the R and T calculated from the hypothesis, for every point $x^1$ in the first set of 3D data points, a transformation $\hat{x}^2 = Rx^1 + T$ is calculated. Points $\hat{x}^2$ are then compared to actual points $x^2$ from the second set of 3D data points. In one embodiment, all points $\hat{x}^2$ are compared to actual points $x^2$. In another embodiment, a randomly selected subset of the points $\hat{x}^2$ is compared to actual points $x^2$. In yet another embodiment, points $x^2$ from the second set of 3D data points are transformed by $\hat{x}^1 = R'x^2 - R'T$ and are compared to actual points $x^1$ from the first set of 3D data points.

In one embodiment, the comparison between transformed points and actual points is performed in the following way.

First, the points $\hat{x}^2$ that lie out of the sensor field of view in the second set of 3D data points are removed, since these points have no corresponding point in the second set of 3D data points. Then, the closest point $x^2$ from the second set of 3D data points is determined for every point $\hat{x}^2$. Then, the number of points $\hat{x}^2$ having a point $x^2$ within a threshold distance is counted. The hypothesis score is the ratio of the number of points $\hat{x}^2$ having a point $x^2$ within a threshold distance, to the number of all points $\hat{x}^2$ within the field of view. In other words, the hypothesis $$\text{score} = \frac{|\{\hat{x}^2 \mid ds(\hat{x}^2, x^2) < T\}|}{|\{\hat{x}^2\}|},$$

where |.| stands for the size of the set and ds(.,.) stands for a distance.

In one embodiment, the closest point $x^2$ to $\hat{x}^2$ is found the following way. Points $\hat{x}^2$ within the sensor field of view are transformed to spherical coordinates (i.e. a horizontal angle $\hat{\theta}^2$, vertical angle $\hat{\phi}^2$, and range $\hat{r}^2$). Here, the following formula is used to find the closest point: $x^2(\theta^2, \phi^2, r^2)$ for every point $$\hat{x}^2:[\theta^2, \phi^2] = \underset{[\theta,\phi,r] \in image2}{\mathrm{argmin}} \{(\hat{\theta}^2 - \theta)^2 + (|\hat{\phi}^2 - \phi|)^2\}.$$

Typically, a single sensor provides no more than one point $x^2(\theta^2, \phi^2, r^2)$ for each pair of $\theta^2, \phi^2$, therefore $\theta^2, \phi^2$ determines each point is uniquely. Alternatively, in other embodiments, similar criterions are used to determine the closest point. Once the closest point $x^2$ to every point $\hat{x}^2$ is determined, the hypothesis score is determined based on ratio of points $\hat{x}^2$ that are within a threshold distance to a point $\hat{x}^2$, to the number of total points $\hat{x}^2$ within the field of view.

In one embodiment, the distance $ds(\hat{x}^2, x^2)$ is defined as $|r^2-\hat{r}^2|<T$, where $x^2=(\theta^2,\phi^2,r^2), \hat{x}^2=(\hat{\theta}^2,\hat{\phi}^2,\hat{r}^2)$. The hypothesis score is then calculated as:

$$\text{Score} = \frac{|\{\hat{x}^2||r^2 - \hat{r}^2| < T\}|}{|\{\hat{x}^2\}|}.$$

In another embodiment, the hypothesis is scored based on the condition $\|x^2-\hat{x}^2\|<T$ instead of the condition $|r^2-\hat{r}^2|<T$, where $\|\bullet\|$ denotes and Eucleidian norm. In other embodiments, other definitions of $ds(\hat{x}^2, x^2)$ might be used.

In one embodiment, system 100 includes one or more actuators 108, and processing unit 104 uses the estimated motion to control actuators 108. Based on the estimated motion, processing unit 104 generates control signals which are sent to actuators 108 to control the movement of a vehicle in which system 100 is located. For example, actuators 108 may be controlled in order to direct system 100 to a desired destination and/or avoid obstacles. For example, in one embodiment, system 100 is located within an aircraft, and processing unit 104 controls actuators 108 on the aircraft, such as the throttle or wing flaps, in order to control the pitch, yaw, and/or thrust of the aircraft. In other embodiments, the estimated motion calculation is used to control actuators after fusion with data from other sensors, such as alternate navigation sensor 105, in order to achieve improved reliability and/or accuracy. For example, alternate navigation sensor 105 can be implemented as, but is not limited to, an inertial measurement unit (IMU), inertial navigation system (INS), attitude and heading reference system (AHRS), GPS, or other system.

In one embodiment, system 100 includes a display device 110. Display device 110 is operable to display navigation data to a user. Here, the motion estimated is translated by processing system 104 and displayed on display device 110. For example, in one embodiment, when the extracted planar features are used to estimate motion, the calculated position and orientation of a vehicle in which system 100 is located are displayed to the user on display device 110. For example, in one embodiment, the calculated position and orientation are displayed as longitudinal and latitudinal coordinates. In an alternative embodiment, the extracted planar features are used for map generation, and the generated map is displayed to the user. Suitable display devices include: CRT displays, active and passive matrix LCDs, and plasma displays.

In another embodiments, processing unit 104 is operable to use the extracted planar features for other navigation tasks, such as, but not limited to, integration of the observed scenes with map data to minimize misalignment of map data to the real world, and automatic map construction based on the observed scenes. In some embodiments, the integrated map is displayed to user on display device 104.

All or some portions of the methods 300, 400, 500, and 550 described above can be implemented in software instructions tangibly embodied on a computer readable medium and executed by a processing unit such as processing unit 104. For example, in one embodiment, software instructions to implement all or some portions of methods 300, 400, 500, and 550 are implemented as code 112 on memory 106. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g., SDRAM, DDR SDRAM, RDRAM, SRAM, etc.), ROM, EEPROM, flash memory, etc.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of controlling an actuator based on a set of three-dimensional (3D) data points, the method comprising:
    obtaining a first set of 3D data points for a scene and a second set of 3D data points for a scene with a sensor;
    extracting at least a first set of planar features from the first set of 3D data points by determining a respective normal vector for each of the first set of 3D data points, wherein the respective normal vector for each of the first set of 3D data points is an estimation of a respective vector normal to the surface at that data point;
    extracting at least a second set of planar features from the second set of 3D data points by determining a respective normal vector for each of the second set of 3D data points, wherein the respective normal vector for each of the second set of 3D data points is an estimation of a respective vector normal to the surface at that data point;

determining a motion between the first set of 3D data points and the second set of 3D data points based on a rotation and a translation from the at least a first set to the at least a second set; and controlling at least one actuator based on the motion.

2. The method of claim 1, wherein extracting at least a first set of planar features further comprises:

determining an orthogonal distance from each data point of the first set of 3D data points to a defined location in the coordinate system;

grouping data points from the first set of 3D data points having similar normal vectors and orthogonal distances to form a first plurality of cells;

determining the at least of first set of planar features based on the first plurality of cells; and wherein extracting at least a second set of planar features further comprises:

determining an orthogonal distance from each data point of the second set of 3D data points to a defined location in the coordinate system;

grouping data points from the second set of 3D data points having similar normal vectors assigned and orthogonal distances to form a second plurality of cells;

determining the at least a second set of planar features based on the second plurality of cells.

3. The method of claim 2, wherein determining up to a first plurality of planar features further comprises:

determining for each cell of the first plurality of cells whether the cell is a local maxima based on the number of data points within the cell; and combining adjacent cells from the first plurality of cells that are local maxima; and wherein determining up to a second plurality of planar features further comprises:

determining for each cell of the second plurality of cells whether the cell is a local maxima based on the number of data points within the cell; and combining adjacent cells from the second plurality of cells that are local maxima.

4. The method of claim 2, wherein determining up to a first plurality of planar features further comprises:

determining a normal vector to represent each cell of the first plurality of cells;

determining an orthogonal distance to represent each cell of the first plurality of cells;

determining which of the first set of 3D data points are associated with a cell of the first plurality of cells based on similarities between the normal vector representing the cell of the first plurality of cells, the orthogonal distance representing the cell of the first plurality of cells and the normal vector and orthogonal distance for the first set of 3D data points; and wherein determining up to a second plurality of planar features further comprises:

determining a normal vector to represent each cell of the second plurality of cells;

determining an orthogonal distance to represent each cell of the second plurality of cells;

determining which of the first set of 3D data points are associated with a cell of the second plurality of cells based on similarities between the normal vector representing the cell of the second plurality of cells, the orthogonal distance representing the cell of the second plurality of cells and the normal vector and orthogonal distance for the second set of 3D data points.

5. The method of claim 2, wherein determining a normal vector for a data point further comprises:

determining a mask for the data point, wherein the mask comprises a plurality of data points surrounding the data point including the data point; and determining a first and a second tangential vectors from a gradient estimated using the mask, wherein the first tangential vector is a vector tangential to a surface of the mask in a first direction and the second tangential vector is a vector tangential to a surface of the mask in another direction;

wherein the normal vector is a cross product of the first and second tangential vectors.

6. The method of claim 1, wherein the sensor is located on a vehicle, the method further comprising:

displaying a position and orientation of the vehicle on a display device based on the determined motion.

7. The method of claim 1, further comprising:

generating a plurality of hypotheses from the at least a first set and the at least a second set;

evaluating each of the plurality of hypotheses; and wherein determining a motion determines a motion based on the hypothesis having the best score.

8. A program product comprising a processor-readable medium on which program instructions are embodied, wherein the program instructions are operable to:

obtain a first set of 3D data points for a scene and a second set of 3D data points for a scene with a sensor;

extract at least a first set of planar features from the first set of 3D data points by determining a respective normal vector for each of the first set of 3D data points, wherein the respective normal vector for each of the first set of 3D data points is an estimation of a respective vector normal to the surface at that data point;

extract at least a second set of planar features from the second set of 3D data points by determining a respective normal vector for each of the second set of 3D data points, wherein the respective normal vector for each of the second set of 3D data points is an estimation of a respective vector normal to the surface at that data point;

determine a motion between the first set of 3D data points and the second set of 3D data points based on a rotation and a translation from the at least a first set to the at least a second set; and display a position and orientation of the vehicle on a display device based on the determined motion.

9. The program product of claim 8, wherein when extracting at least a first set of planar features the program instructions are further operable to:

determine an orthogonal distance from each data point of the first set of 3D data points to a defined location in the coordinate system;

group data points from the first set of 3D data points having similar normal vectors and orthogonal distances to form a first plurality of cells;

determine the at least a first set of planar features from the first plurality of cells; and wherein when extracting at least a first set of planar features the program instructions are further operable to:

determine a motion between the first set of 3D data points and the second set of 3D data points based on the first plurality of planar features and the second plurality of planar features;

determine an orthogonal distance from each data point of the second set of 3D data points to a defined location in the coordinate system;

group data points from the second set of 3D data points having similar normal vectors and orthogonal distances to form a second plurality of cells;

determine the at least a second plurality of planar features from the second plurality of cells.

10. The program product of claim 9, wherein when determining up to a first plurality of planar features the program instructions are further operable to:
- determine a normal vector to represent each cell of the first plurality of cells;
- determine an orthogonal distance to represent each cell of the first plurality of cells;
- determine which of the first set of 3D data points are associated with a cell of the first plurality of cells based on similarities between the normal vector representing the cell of the first plurality of cells, the orthogonal distance representing the cell of the first plurality of cells and the normal vector and orthogonal distance for the first set of 3D data points; and
- wherein when determining up to a second plurality of planar features the program instructions are further operable to:
- determine a normal vector to represent each cell of the second plurality of cells;
- determine an orthogonal distance to represent each cell of the second plurality of cells;
- determine which of the first set of 3D data points are associated with a cell of the second plurality of cells based on similarities between the normal vector representing the cell of the second plurality of cells, the orthogonal distance representing the cell of the second plurality of cells and the normal vector and orthogonal distance for the second set of 3D data points.

11. The program product of claim 9, wherein when determining a normal vector for a data point the program instructions are further operable to:
- determine a mask for the data point, wherein the mask comprises a plurality of data points surrounding the data point including the data point; and
- determine a first and a second tangential vectors from a gradient estimated using the mask, wherein the first tangential vector is a vector tangential to a surface of the mask in a first direction and the second tangential vector is a vector tangential to a surface of the mask in another direction;
- wherein the normal vector is a cross product of the first and second tangential vectors.

12. The program product of claim 8, wherein the program instructions are further operable to: control at least one actuator based on the determined motion.

13. The program product of claim 8, wherein the program instructions are further operable to:
- generate a plurality of hypotheses from the at least a first set and the at least a second set;
- evaluate each of the plurality of hypotheses; and
- wherein determining a motion determines a motion based on the hypothesis having the best score.

14. A system comprising:
- a sensor operable to obtain a first set of three-dimensional (3D) data points for a scene and a second set of 3D data points for a scene; and
- a processing unit coupled to the sensor;
- a storage medium communicatively coupled to the processor from which the processor reads at least a portion of the software for execution thereby, wherein the software is configured to cause the processor to:
  - extract at least a first set of planar features from the first set of 3D data points by determining a respective normal vector for each of the first set of 3D data points, wherein the respective normal vector for each of the first set of 3D data points is an estimation of a respective vector normal to the surface at that data point;
  - extract at least a second set of planar features from the second set of 3D data points by determining a respective normal vector for each of the second set of 3D data points, wherein the respective normal vector for each of the second set of 3D data points is an estimation of a respective vector normal to the surface at that data point;
  - determine a motion between the first set of 3D data points and the second set of 3D data points based on a rotation and a translation from the at least a first set to the at least a second set; and
- display a position and orientation of the vehicle on a display device based on the determined motion.

15. The system of claim 14, wherein when extracting at least a first set of planar features the processing unit is further configured to:
- determine an orthogonal distance from each data point of the first set of 3D data points to a defined location in the coordinate system;
- group data points from the first set of 3D data points having similar normal vectors and orthogonal distances to form a first plurality of cells;
- determine the at least a first set of planar features from the first plurality of cells; and
- wherein when extracting at least a first set of planar features the processing unit is further configured to:
- determine a motion between the first set of 3D data points and the second set of 3D data points based on the first plurality of planar features and the second plurality of planar features;
- determine an orthogonal distance from each data point of the second set of 3D data points to a defined location in the coordinate system;
- group data points from the second set of 3D data points having similar normal vectors and orthogonal distances to form a second plurality of cells;
- determine the at least a second plurality of planar features from the second plurality of cells.

16. The system of claim 15, when determining up to a first plurality of planar features the processing unit is further configured to:
- determine for each cell of the first plurality of cells whether the cell is a local maxima based on the number of data points within the cell; and
- combine adjacent cells from the first plurality of cells that are local maxima; and
- wherein when determining up to a second plurality of planar features the processing unit is further configured to:
- determine for each cell of the second plurality of cells whether the cell is a local maxima based on the number of data points within the cell; and
- combine adjacent cells from the second plurality of cells that are local maxima.

17. The system of claim 15, wherein when determining up to a first plurality of planar features the processing unit is further configured to:
- determine a normal vector to represent each cell of the first plurality of cells;
- determine an orthogonal distance to represent each cell of the first plurality of cells;
- determine which of the first set of 3D data points are associated with a cell of the first plurality of cells based on similarities between the normal vector representing the cell of the first plurality of cells, the orthogonal distance representing the cell of the first plurality of cells and the normal vector and orthogonal distance for the first set of 3D data points; and wherein when determining up to a second plurality of planar features the processing unit is further configured to:

determine a normal vector to represent each cell of second plurality of cells;

determine an orthogonal distance to represent each cell of the second plurality of cells;

determine which of the first set of 3D data points are associated with a cell of the second plurality of cells based on similarities between the normal vector representing the cell of the second plurality of cells, the orthogonal distance representing the cell of the second plurality of cells and the normal vector and orthogonal distance for the second set of 3D data points.

18. The system of claim 15, wherein when determining a normal vector for a data point the processing unit is further configured to:

determine a mask for the data point, wherein the mask comprises a plurality of data points surrounding the data point including the data point; and determine a first and a second tangential vectors from a gradient estimated using the mask, wherein the first tangential vector is a vector tangential to a surface of the mask in a first direction and the second tangential vector is a vector tangential to a surface of the mask in another direction;

wherein the normal vector is a cross product of the first and second tangential vectors.

19. The system of claim 14, wherein the processing unit is further configured to:

control at least one actuator based on the determined motion.

20. The system of claim 14, wherein the processing unit is further configured to:

generate a plurality of hypotheses from the at least a first set and the at least a second set;

evaluate each of the plurality of hypotheses; and wherein determining a motion determines a motion based on the hypothesis having the best score.

* * * * *